(12) United States Patent
Erriu

(10) Patent No.: US 7,315,088 B2
(45) Date of Patent: Jan. 1, 2008

(54) FLUID DEVICE FOR RECOVERY OF THE KINETIC ENERGY OF A VEHICLE

(76) Inventor: Fernando Erriu, Loc. Pranu Mois, 09040 San Basilio (IT)

(*) Notice: Subject to any disclaimer, the term of this patent is extended or adjusted under 35 U.S.C. 154(b) by 0 days.

(21) Appl. No.: 10/563,573

(22) PCT Filed: Jul. 6, 2004

(86) PCT No.: PCT/IB2004/002219

§ 371 (c)(1),
(2), (4) Date: Feb. 26, 2007

(87) PCT Pub. No.: WO2005/005831

PCT Pub. Date: Jan. 20, 2005

(65) Prior Publication Data

US 2007/0246282 A1   Oct. 25, 2007

(30) Foreign Application Priority Data

Jul. 9, 2003 (IT) ............... CA2003A0004
Mar. 30, 2004 (IT) ............... CA2004A0004

(51) Int. Cl.
*F03G 7/02* (2006.01)

(52) U.S. Cl. ............... 290/1 R; 290/2; 290/1 A; 290/4 D; 60/5; 60/6; 60/53

(58) Field of Classification Search ............... 290/1 R, 290/2, 4 D, 1 A; 60/5, 6, 53
See application file for complete search history.

(56) References Cited

U.S. PATENT DOCUMENTS

| 344,911 A | 7/1886 | Kimball |
| 1,771,200 A | 7/1930 | Akers |
| 4,173,431 A | 11/1979 | Smith |
| 4,212,598 A | 7/1980 | Roche et al. |
| 4,214,170 A * | 7/1980 | Leonard ............... 290/1 R |
| 4,309,619 A * | 1/1982 | Cahill et al. ............... 290/1 R |
| 4,333,017 A * | 6/1982 | O'Connell ............... 290/2 |
| 5,355,674 A | 10/1994 | Rosenberg |
| 6,204,568 B1 | 3/2001 | Runner |

FOREIGN PATENT DOCUMENTS

| DE | 29 41 079 A | 4/1981 |
| GB | 2 290 115 A | 12/1995 |

* cited by examiner

*Primary Examiner*—Darren Schuberg
*Assistant Examiner*—Iraj A. Mohandesi
(74) *Attorney, Agent, or Firm*—Ladas & Parry

(57) ABSTRACT

Described herein is a fluid device for the recovery of the kinetic energy of land vehicles, comprising an intake line, a delivery line, and a pumping unit, which is connected to the intake line and to the delivery line, and at least one actuating element set along a street or railroad course of an infrastructure for the transit of vehicles, functionally connected to the pumping unit and mobile between a position of unloading and a position of loading, in which the actuating element is designed to be surmounted by a vehicle travelling along the street or railroad infrastructure.

6 Claims, 7 Drawing Sheets

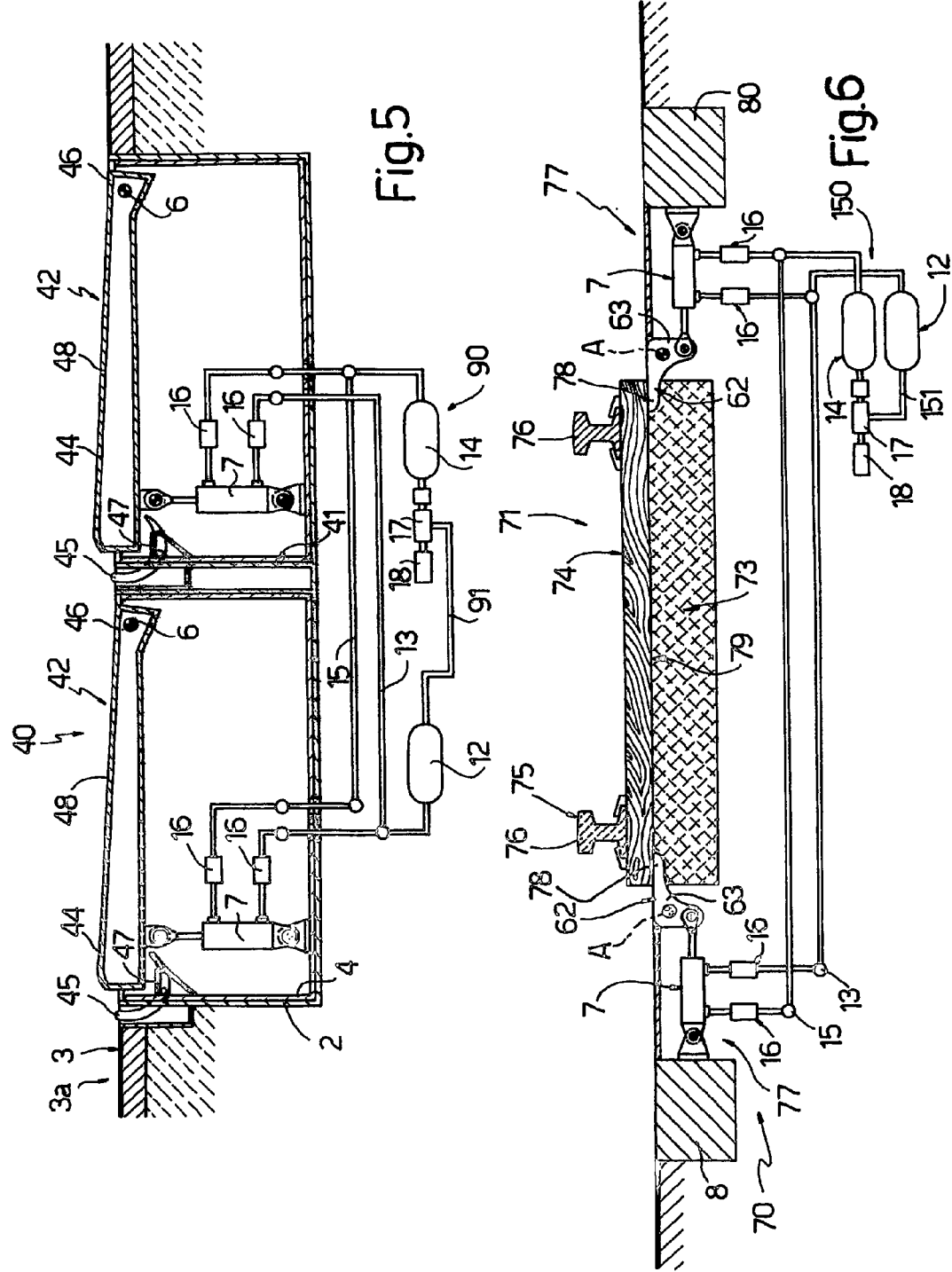

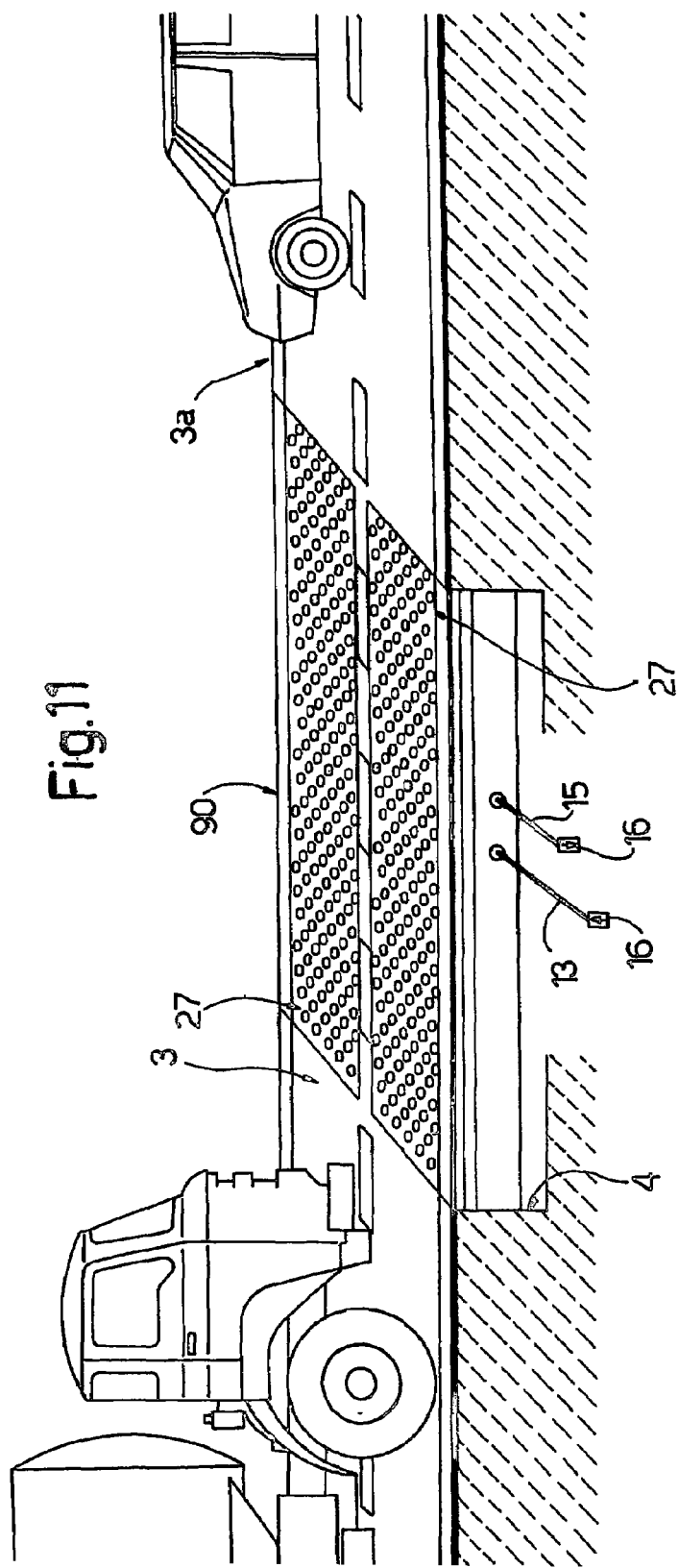

FLUID DEVICE FOR RECOVERY OF THE KINETIC ENERGY OF A VEHICLE

TECHNICAL FIELD

The present invention relates to a fluid device for recovery of the kinetic energy of a land vehicle travelling along a street or railroad.

BACKGROUND ART

The recovery of the kinetic energy of a vehicle consists in the conversion of the kinetic energy itself into a form of accumulatable potential energy, for example the potential energy of a fluid. Subsequently, the potential energy accumulated is used as a source of energy for the actuation of machines for producing electrical energy in a clean way without pollutant emissions and alternative with respect to the classical modality of producing electrical energy, such as through the combustion of fossil fuels in thermo-electric power stations.

As is known, for the production of clean and alternative electrical energy, there are currently used devices driven by wind power capable of converting the kinetic energy of a moving mass of air into electrical energy through aerogenerators equipped with vanes driven by the wind and connected to an alternator.

In addition, there are also used photovoltaic panels capable of converting solar energy into electrical energy by means of the exploitation of the physical properties of particular materials.

Alternatively, it is possible to use devices which, exploiting motion of waves or marine currents, are able to drive fluid machines for accumulating fluid under pressure.

The foregoing methods of production of clean and alternative electrical energy have complex and very costly components and call for generally extensive plants, thus causing a considerable environmental impact.

Furthermore, wind-energy and solar-energy plants can be exploited for a relatively short periods of the day and can be exploited only in particular geographical areas.

DISCLOSURE OF INVENTION

The purpose of the present invention is to provide a device for recovering the kinetic energy of a vehicle which will be free from the drawbacks described above.

According to the present invention, a device is provided for the recovery of the kinetic energy of a vehicle, as defined in claim 1.

BRIEF DESCRIPTION OF THE DRAWINGS

For a better understanding of the present invention, there are now described some preferred embodiments, purely by way of non-limiting example and with reference to the attached drawings, in which:

FIGS. 2 to 10 are schematic cross sections of some embodiments of the device for the recovery of the kinetic energy of a vehicle according to the present invention; and FIG. 11 is a perspective view of an embodiment of the present invention.

BEST MODE FOR CARRYING OUT THE INVENTION

Figure 1:
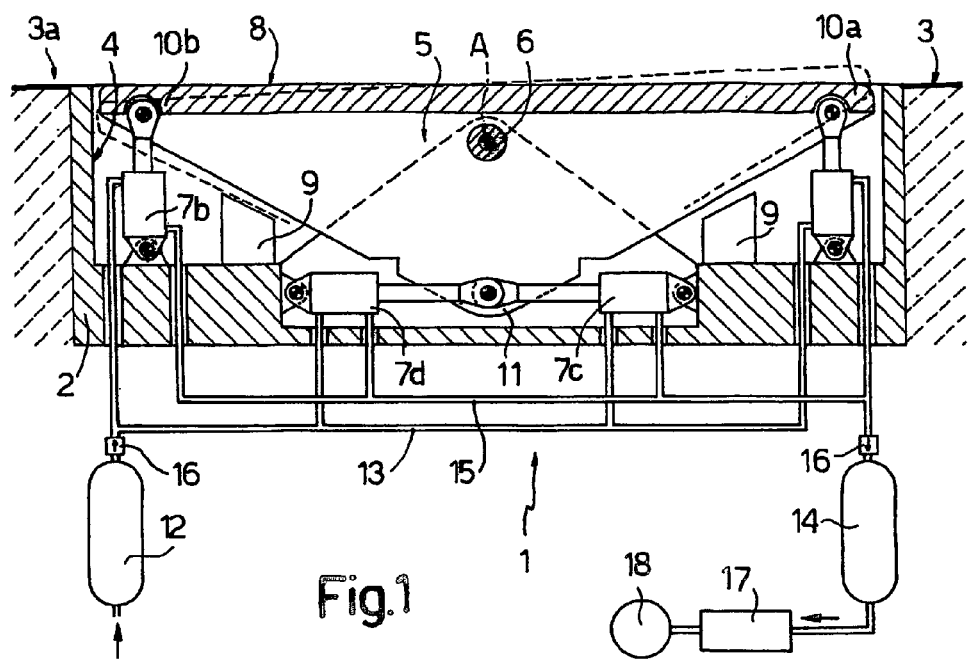
FIG. 1 is a schematic cross section of a first embodiment of a device for the recovery of the kinetic energy of a vehicle according to the present invention.

In FIG. 1, designated as a whole by the reference number 1 is a device for recovering the kinetic energy of a vehicle comprising: a supporting structure 2 set underneath a street course 3 in contact with the tyres of vehicles travelling along a road infrastructure 3a, such as a street, for automobiles and defining a housing cavity 4 open towards the road course 3 itself; a platform 5 housed within the cavity 4 and designed to be traversed by a vehicle travelling on the road course 3; and a multiplicity of hydraulic jacks 7 connected to the platform 5 and to the supporting structure 2 and comprising the jacks 7a, 7b, 7c, 7d.

In particular, the platform 5 oscillates about a pair of pins 6 constrained to the supporting structure 2 and has a prismatic body with a base having the shape of an isosceles triangle, comprising a base surface 8 facing the outside of the cavity 4 and designed to support the tyres of vehicles travelling on the road course 3. The platform 5 oscillates about an axis A of the pins 6, which are arranged parallel to the road course 3 and on a plane of symmetry of the platform 5 transversely with respect to the direction of travel of the vehicles, and alternately comes to bear upon two end-of-travel elements 9 arranged symmetrically with respect to the axis A and defining, in one case, a position of loading and, in the other, a position of unloading.

In addition, the jacks 7a, 7b are connected to the platform 5 in positions corresponding to respective sharp-edged portions 10a, 10b of the platform 5 adjacent to the base surface 8 and have a direction of travel that is substantially perpendicular to the road course 3, and the jacks 7c, 7d are connected to a vertex portion 11 inside the cavity 4 and have a direction of travel parallel to the road course 3.

The jacks 7 are connected to a supply reservoir 12 via an intake line 13 and to a delivery reservoir 14 via a pressurized line 15, both of the reservoirs 12 and 14 being provided with respective non-return valves 16.

Furthermore, the delivery reservoir 14 is connected to a hydraulic motor 17 actuating an alternator 18 for the generation of electrical energy.

There now follows a description of alternative embodiments of the present invention, in which elements that are identical or correspond to those of the embodiment described previously are designated by the same reference numbers.

Figure 2:
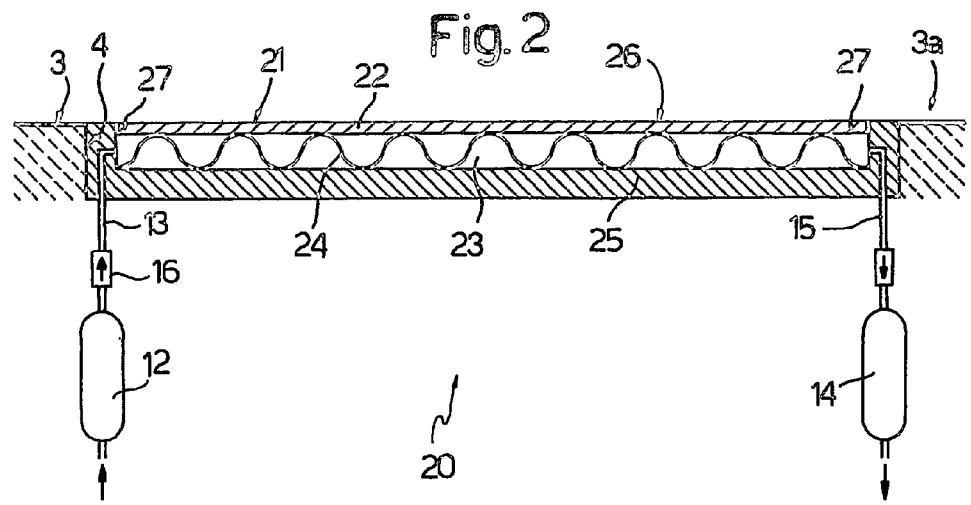

FIG. 2 represents a device 20 comprising a pumping carpet-like band 21 presenting a top wall 22 with membrane actuation made of deformable polymeric material and mobile between the position of unloading and the position of loading.

The carpet-like band 21 has a chamber 23 defined at the top by the top wall 22 and connected to the intake line 13 and to the delivery line 14, and an elastic corrugated plate 24 housed inside the chamber 23 on a base wall 25, which delimits, at the bottom, the chamber 23 for maintaining the top wall 22 aligned to the road course 3.

In particular, the carpet-like band 21 is housed within the cavity 4, and the top wall 22 has a contact surface 26 co-operating with the tyres of the vehicles travelling and integrally comprises peripheral end portions 27 fixed to and at the same level as the road course 3, thus forming a continuous surface with the road course 3 itself.

Figure 3:
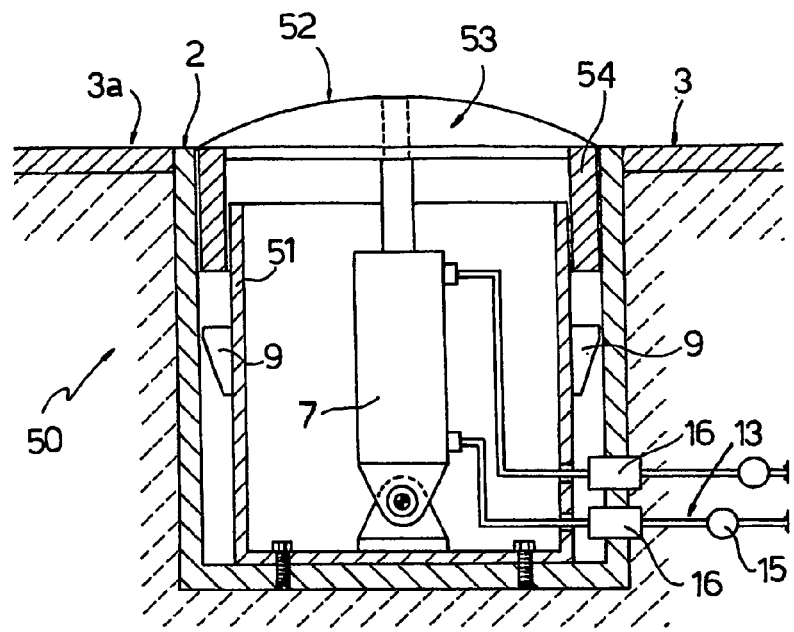

In FIG. 3, a modular device 40 comprises a supporting structure 2 presenting two compartments 41 housing a pair of recovery units 42 connected in parallel to the intake line 13 and the pressurized line 15. Each recovery unit 42 comprises a rectangular inclined plate 44 oscillating against the action of an elastic-return lever 45 about the pins 6 arranged in a way similar to the device 1 but in the proximity of a side 46 of the inclined plate 44 transverse to the direction of travel of the vehicles.

Each unit 42 moreover comprises a stopping bracket 47 rigidly connected to the supporting structure 2 on the opposite side of the pins 6 and designed to limit oscillation of the inclined plate 44 when it is surmounted by the vehicles.

The jacks 7 are connected to the inclined plate 44 in the proximity of the stopping bracket 47 to provide a third-class lever mechanism.

Figure 4:
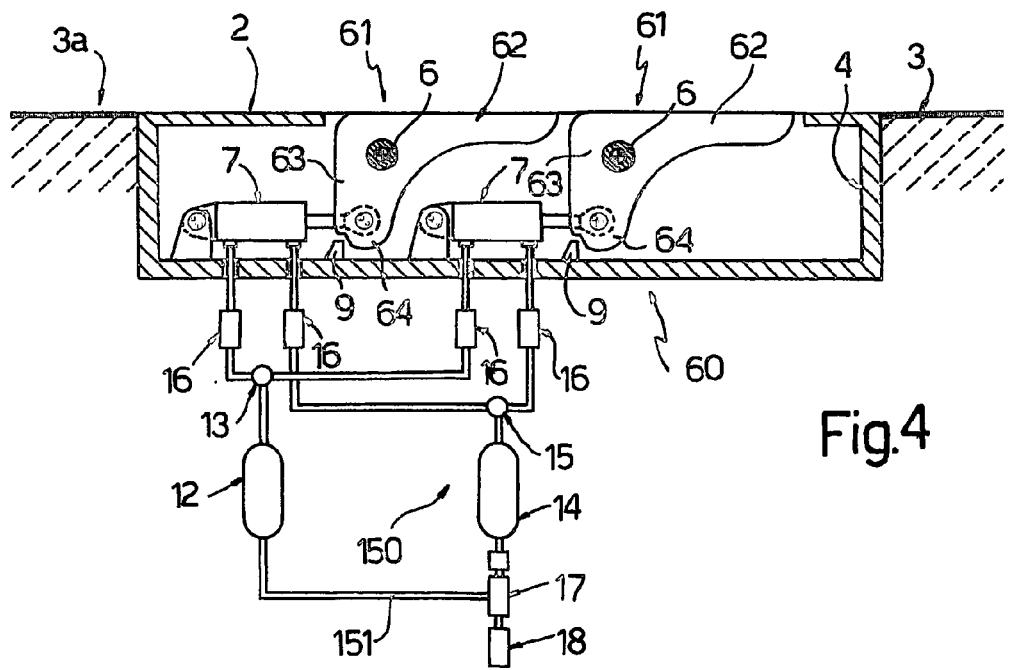

In FIG. 4, a device 50 comprises a hollow cylindrical guide wall 51 set on the supporting casing 3 and housing the jack 7, and a piston 52 comprising a concave head 53 and a cylindrical side wall 54, which can slide along the guide wall 51.

In particular, the piston 52 slides in a direction perpendicular to the road course 3 until comes to stop against the end-of-travel elements 9, which are rigidly connected to the guide walls 51.

In FIG. 5, a device 60 has a pair of units 61 connected in parallel in a way similar to that of the device 50. Furthermore, each unit 61 has integrally an actuation plate 62 oscillating about the axis A and aligned to the road course 3 in the position of unloading, and a return arm 63 perpendicular to the actuation plate 62.

The actuation plate 62 is hinged to the pins 6 in the proximity of the return arm 63, which comprises an end portion 64 opposite to the actuation plate 62, connected to the jacks 7, which are arranged parallel to the road course 3, and co-operating with the end-of-travel element 9.

FIG. 6 illustrates a device 70 set along a railroad infrastructure or railroad 71 comprising an elastic bed 73, made of gravel, a plurality of sleepers 74 carried by the bed 73, and tracks 75, which co-operate with the wheels of a train and comprise a multiplicity of rails 76.

The device 70 comprises units 77 similar to the units 61 e arranged at the level of the bed 73 of the railroad 71 at the opposite ends of the sleepers 74. In particular, the resting plate 62 has the axis A of the respective pins 6 parallel to the rails 76, and comprises an end portion 78 opposite to the jacks 7 with respect to the axis A and in contact with a bottom surface 79 of the sleeper 74, and the jacks 7 are arranged horizontally against respective plinths 80 made of cement fixed at the level of the bed 73 and on opposite lateral sides of the sleeper 74.

Figure 7:
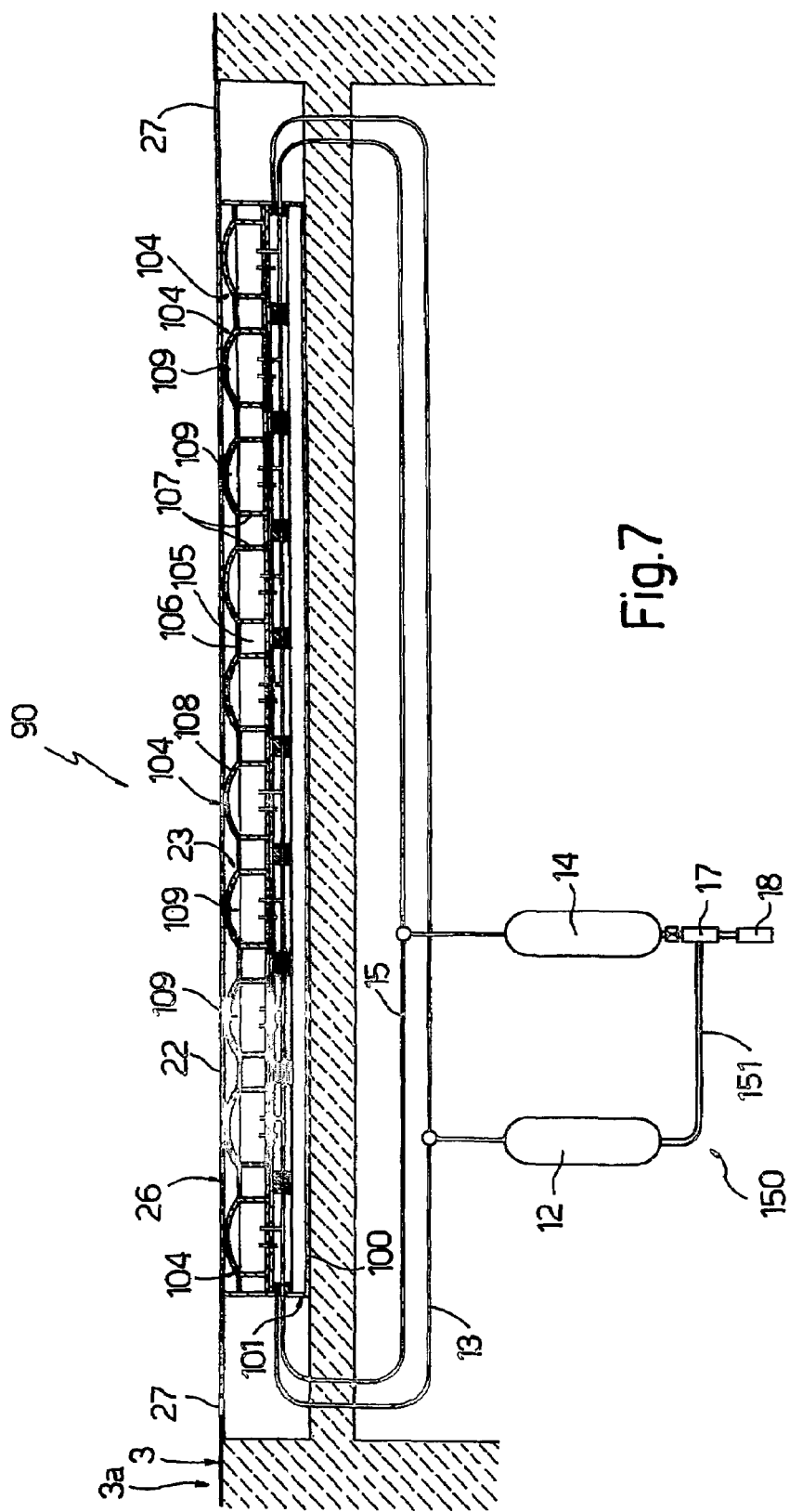
Figure 8:
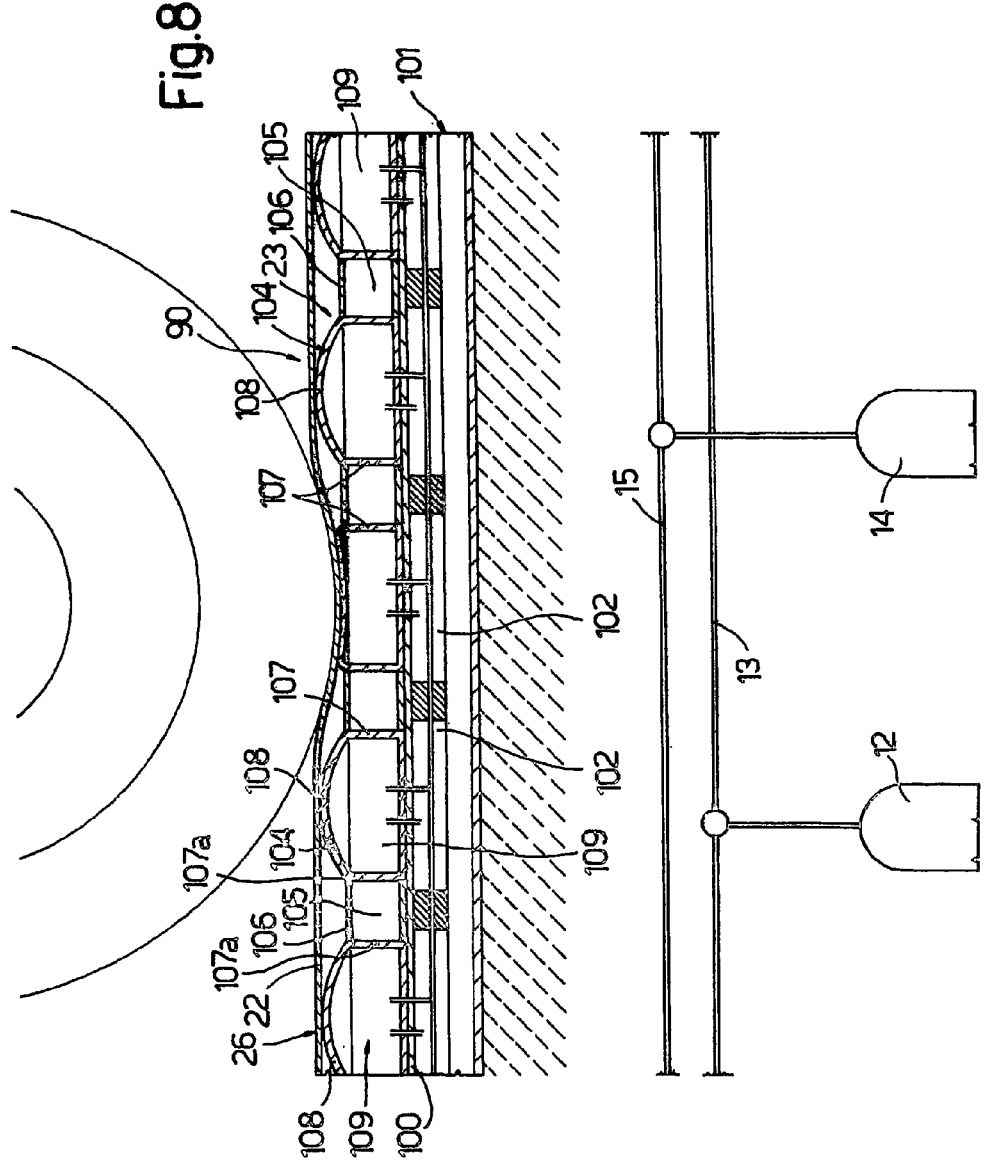

FIGS. 7 and 8 represent a device 90 similar to the device 20 and comprising: a rigid plate 100, which delimits the chamber 23 at the bottom; a base 101, which supports the rigid plate 100 and has a multiplicity of intake tanks or chambers 102 connected to one another and to the supply reservoir 12 via the intake line 13.

The device 90 further comprises, inside the chamber 23, a honeycomb structure 103 having a multiplicity of deformable pumping elements 104, which are set on top of the respective chambers 102 and are spaced by rigid elements 105 having respective top abutment walls 106. Each deformable element 104 is connected to the tanks 102 by the intake line 13 and comprises side walls 107, which comes out from the rigid plate 100, and a deformable head membrane 108, which is set underneath the top wall 22, is sealed to the side walls 107, and defines a variable-volume chamber 109 having a hexagonal layout.

Each chamber 109 is provided with two non-return valves 16, one for delivery to the pressurized line 15 and the other for intake from the tanks 102.

Figure 9:
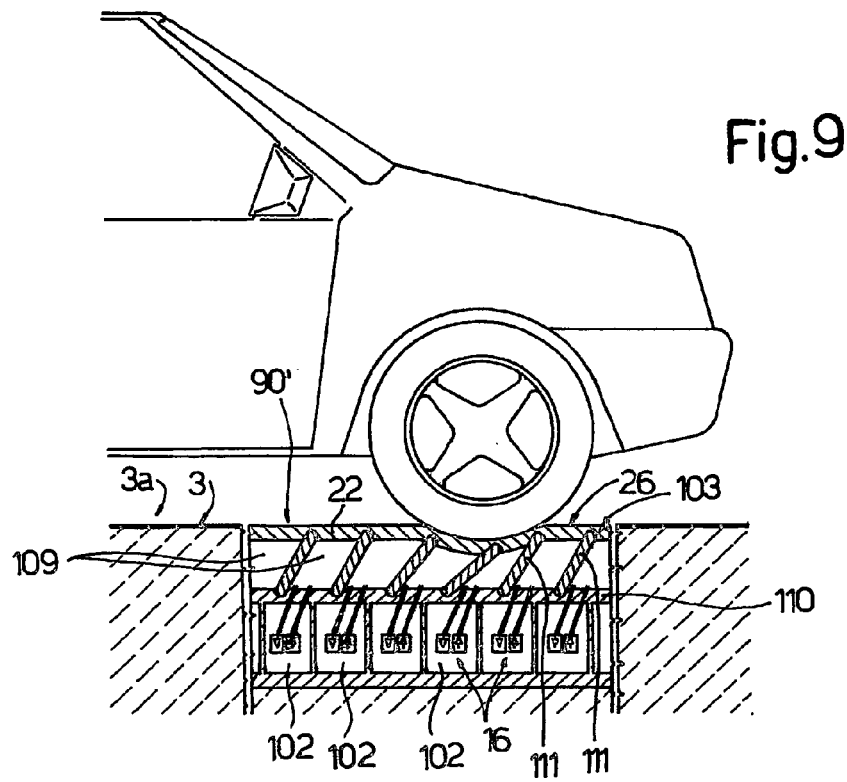

FIG. 9 shows a device 90', which is similar to the device 90 and comprises a deformable bottom wall 110 carried by the base 101, the top wall 22 and a multiplicity of plane rigid separating walls 111 set parallel to one another and delimiting the chambers 109, since they are transverse to the walls 22 and 110.

In particular, the separating walls 111 are hinged in a fluid-tight way to the walls 22 and 111 to enable pumping of the chambers 109 as a vehicle passes on the top wall 22.

Figure 10:
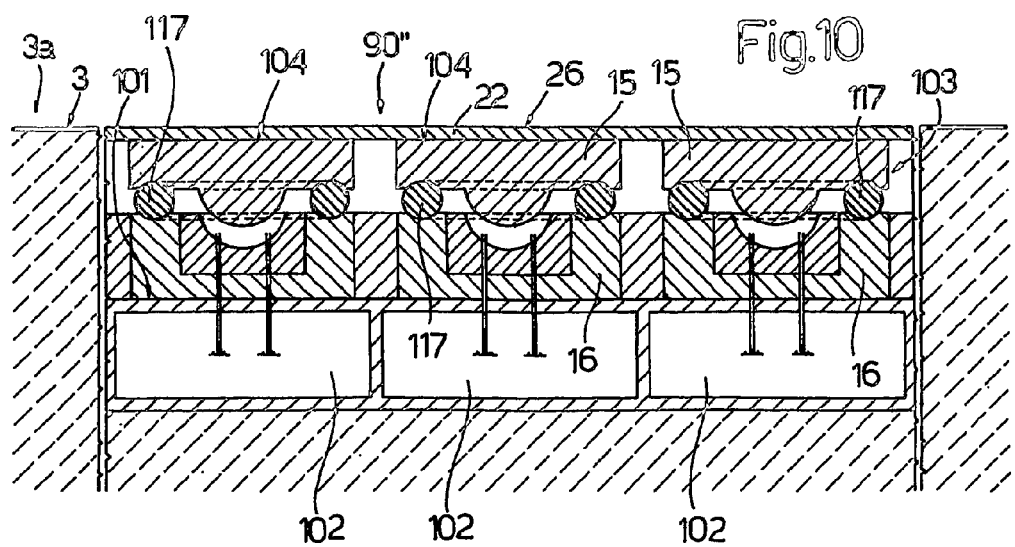

The device 90" illustrated in FIG. 10 is similar to the device 90, and the pumping elements 104 comprise a multiplicity of rigid elements, a male one 115 and a female one 116 set facing one another and fixed to the top wall 22 and to the base 101, respectively, and deformable elastic gaskets 117, which have a ring shape and a section that may be of various shapes and is preferably circular, and are set between the respective pairs of male and female elements 115, 116. The respective chambers 109 are delimited by the respective male and female elements 115, 116 and by the respective gaskets 117, which are designed both to guarantee return into position of the device 20 at the level of the road course 3a and to define the travel of each rigid male element 115 inside the respective rigid female element 116.

Operation of the device 1 is described in what follows.

The device 1 is in a position of unloading, in which the platform 5 is resting on the first end-of-travel element 9, the platform 5 being inclined in the direction of travel of a lane having a road course 3, and the sharp-edged portion 10a of the platform 5 being at a greater height than the road course 3.

When advancing, a wheel of the vehicle reaches the device 1 and climbs onto the sharp edge boa, so causing rigid rotation of the platform 5 about the axis A until the second end-of-travel element 9 opposite to the first is reached. This rigid rotation compresses both the vertical jack 7a set between the axis A of the wheel and the horizontal jack 7d set on the opposite side of the axis A with respect to the vehicle, extending the respective two other jacks 7b and 7c.

In this way, the jacks 7a, 7d function as pumps and send, via the non-return valves 16, fluid under pressure to the delivery reservoir 14, and, accordingly, the jacks 7c, 7b take in fluid from the supply reservoir 12 through non-return valves 16 appropriately arranged along the intake line 13.

As it proceeds, the wheel passes beyond the axis A and causes a rigid rotation of the platform 5 in a direction opposite to the previous rotation. In this way, the platform 5 functions as a third-class lever, actuating the intake of the jacks 7a, 7d and the pumping of the jacks 7c, 7b and the descent of the sharp-edged portion 10b of the platform 5 beneath the road course 3.

Consequently, at the passage of each wheel, the platform 5 generates a double-acting pumping effect in regard to the delivery reservoir 14.

Finally, the vehicle traverses the entire platform 5 and, once it has reached the point where it is on the sharp-edged portion 10b, goes back onto the road course 3, an amount of kinetic energy of the vehicle being converted into potential energy of fluid, which, being stored in the delivery reservoir 14, is used by the motor 17 to actuate the alternator 18 and produce electrical energy.

Likewise, the device 20, in the position of unloading, has the top wall 22 sustained by the corrugated plate 24 substantially at the level of the road course 3 and the chamber 23 full of fluid. When the wheel of the vehicle climbs onto the device 20, the top wall 22 moves downwards, in particular is deformed, yielding under the weight of the vehicle, and compresses, in the position of loading, both the chamber 23 and the corrugated plate 24, so coming to bear upon the base wall 25. The reduction of the volume of the chamber 23 causes pumping of the fluid to the delivery reservoir 14, the supply reservoir 12 being closed by the non-return valve 16 of the intake line 13.

Subsequently, upon passage of the wheel, the corrugated plate 24 expands elastically, bringing the chamber 23 back to the undeformed volume and drawing in fluid from the supply reservoir 12, so bringing the top wall 22 back into the position of unloading.

In the device 40, the inclined plate 44 is, in the position of unloading, inclined in a direction opposite to the direction of travel. Upon passage of the vehicle, the wheel immediately encounters the axis A and after exceeding it, inclines the inclined plate 44 that is bearing upon the stopping bracket 47, so compressing the jack 7, and opposing the action of the elastic-return lever 45. In this way, the action is similar to that of the device 1, but, upon passage of each wheel, there is generated a single-acting pumping operation. Furthermore, the bracket is set at a height such that, when the inclined plate 44 comes to bear upon it, a treading surface 48 carried by the plate 44 itself is aligned to the road course 3.

Consequently, once the end of the inclined plate 44 opposite to the side 46 has been reached, the wheel comes to be at the same height as the road course 3 and proceeds, whilst the elastic-return lever 45 raises the inclined plate 44 from the stopping bracket 47, bringing it back to the position of unloading.

In the device 50, operation is similar to that of the device 40; i.e., the head 53 is in a position of unloading in relief with respect to the road course 3 and is compressed by a vehicle that is travelling on the road, thus generating the pumping action of the jack 7 that is connected thereto.

The device 60 functions in a way similar to the device 1, the axis A, however, being set asymmetrically with respect to the actuation plate 62.

In the device 70 operation exploits the compliance of the bed 73 of a railroad infrastructure 71 for the passage of a train; namely, the deflection of the rails 76 on the bed 73 actuates the jacks 7 upon passage of the train.

Operation is similar to that of the devices 40 and 50, but the elastic element for restoring the position of unloading is represented by the elastic return of the rails 76 and by the elasticity of the bed 73 itself.

Operation of the device 90 is similar to that of the device 20, and the pumping operation is performed by the head membranes 108 of the honeycomb structure 103, and the top wall 22 has the purpose of providing protection, since it moreover bears both upon a respective top end portion 107a of the side walls 107 connected in a fluid-tight way to the respective head membranes 108 and upon the respective abutment walls 106.

In the device 90' the separating walls 111 move upon passage of the vehicles sending fluid under pressure to the delivery line, and subsequently the chambers 109 resume the initial position thanks to the intrinsic elasticity of the top wall 22.

From an examination of the characteristics of the devices for recovery of the kinetic energy obtained according to the present invention, the advantages that it makes possible are evident.

In particular, the recovery devices are able to convert the kinetic energy of the vehicles travelling into fluid potential energy, which can be used for reproducing electrical energy.

The transit of vehicles is spread throughout a considerable number of geographical areas and can be exploited during a considerable range of time both during the day and throughout the year as compared, for example, to solar energy.

Furthermore, the device reaches maximum values of efficiency when it is set along paths where vehicles slow down, such as at motorway barriers. In this case, in fact, the device converts into usable energy kinetic energy that would otherwise be dissipated into thermal energy of friction during braking.

The proposed devices are moreover compact, so that they can be easily buried and can be obtained using simple components, which are readily available and far from expensive.

In particular, the use of the membrane devices 20, 90, 90' and 90" proves particularly advantageous from the standpoint of the vertical encumbrance, which may vary from a few centimeters to a few tens of centimeters, enabling minimal work of adaptation of the street or railroad infrastructures 3a and 71.

The top membrane wall 22 can be connected in a continuous way to the road course 3, just as the rail 76 to the tracks 75. In this way there are no interstices in which debris could accumulate, thus rendering maintenance costs minimal.

In addition, the number of components is particularly small since the top wall 22 is directly in contact with the tyres, and the materials that can be used, such as polyurethane, are suitable both for the rigid parts, for example the side walls 107 and the rigid plate 100, and for the deformable parts, for example the top wall 22 and the head membranes 108, at the same time also having optimal wear-resistant properties.

The membrane devices can extend throughout the width of the carriageway (FIG. 11), functioning with the same principle for all the vehicles travelling irrespective of the direction in which they are travelling. The pressure that can be obtained at the delivery end of the membrane devices is inversely proportional to the size of the cells, whilst the flow rate is directly proportional to the number of head membranes 108 surmounted by the tyres of the vehicle that is travelling. In particular, the membrane devices can be sized so as to operate with hydraulic fluid and are able to supply pressures of 200 bar and over.

The aforesaid membrane devices can be installed both in stretches characterized by slow traffic and in ones characterized by fast traffic in so far as the tyres deform the top wall 22 only by a few millimeters, stressing the shock-absorbers in a way similar to a slight imperfection of the road course, consequently without jeopardizing their working life and operation.

In addition, the reliability of the device 20 is improved owing to the absence of pins or mechanisms, which are, moreover, cumbersome, and on account of the presence of the top membrane 22, which prevents wear of the head membranes 108.

Furthermore, it is possible to apply a membrane device to a railroad arranging the top wall 22 underneath and possibly in contact with the sleepers 74. Also in this application the few millimeters of deflection of the rails 76 due to the intrinsic elasticity of the bed 73 are sufficient to obtain a correct operation of the device without affecting the trim and safety of the train.

The device 70 is particularly easy to install along a railroad, since minimum works of adaptation of the bed are necessary, and the fact of exploiting the intrinsic elasticity of the bed 73 and of the rails 76 reduces the components used for producing the system to the minimum.

Furthermore, it is possible to construct plants by grouping together in parallel a multiplicity of said devices and equipping long stretches of street or railroad. Said plants present little or no environmental impact, and, by exploiting the large volumes of traffic, it is possible to size mobile elements having small strokes, without thereby altering the present conditions of reliability and noise of road courses.

Finally, it is clear that modifications and variations can be made to the devices for recovery of kinetic energy described and illustrated herein, without thereby departing from the sphere of protection of the present invention, as defined in the annexed claims.

In particular, the device can be installed along any street or railroad infrastructure adapted for vehicles travelling over land.

It is also possible to provide a closed loop circuit 150 comprising the intake line 13 and the pressurized line 15 and a return line 151 connected to the hydraulic motor 17 and the supply reservoir 12 in order to recycle the fluid, which can be, for example, air or oil.

Furthermore, it is possible to envisage the generation of electrical energy continuously without the need to accumulate fluid in the delivery reservoir 14 when the device is set along a street or railroad infrastructure traversed by high levels of traffic.

In the device 70, the plinths 80 can be arranged underneath the tracks 75, and the jacks 7, which are mobile in a vertical direction, can be connected rigidly and directly to the sleepers 74, further reducing the number of pieces used.

Furthermore, the chambers 109 can be of innumerable shapes, for example circular, and the head membranes 108 of the honeycomb structure 103 can come directly into contact with the tyres without being covered by the top wall 22. In this case, the level of the top portion 107a of the side walls 107 is substantially aligned with the road course 3, thus creating a continuous surface.

The invention claimed is:

1. A fluid device (1; 20; 40; 50; 60; 70; 80; 90; 90'; 90") for recovery of the kinetic energy of vehicles, comprising an intake pipe (13), a delivery pipe (15), and a pumping unit (7; 22; 104), which is connected to said intake pipe (13) and to said delivery pipe (15) for sending fluid under pressure from said intake pipe (13) to said delivery pipe (15), and one elastically deformable actuating element (22; 76), which is suitable for being set along a road or railway course (3; 75) of a road or railway infrastructure (3a, 71) for land vehicles, cooperates with said pumping unit (7; 22; 104) and can move between an unloaded position of and a loaded position, in which said actuating element (22; 76) is adapted to be surmounted by a vehicle travelling along said road course (3), said actuating element (22; 76) having a contact surface (26) suitable for being in contact with said vehicles, said fluid device being characterized in that said pumping unit (7; 22; 104) comprises rigid walls (101, 107) and a membrane (108) connected in a fluid tight manner to said rigid walls (101, 107) and cooperating with said actuating element (22; 76) to pump said fluid into said delivery pipe (15).

2. Fluid device according to claim 1, characterized in that it comprises a base (101) supporting said pumping unit (104) and defining a multiplicity of chambers (12) fluidly connected to said pumping unit (104).

3. Fluid device according to claim 1, characterized in that said actuating element is a second membrane (22).

4. Fluid device according to claim 1, characterized in that said actuating element is a rail (76).

5. Fluid device according to claim 1, characterized in that said fluid follows a closed circuit (150).

6. Fluid device according to claim 1, characterized in that it comprises rigid elements (105, 107a) disposed below said actuating element (22) and supporting said actuating element (22) in said loaded position.

* * * * *